United States Patent [19]

Wakeman et al.

[11] 3,788,574

[45] Jan. 29, 1974

[54] ENDLESS TAPE CARTRIDGE

[75] Inventors: Alfred W. Wakeman, Durham; Robert L. Manierre, Stamford, both of Conn.

[73] Assignee: Audio Devices, Inc., Glenbrook, Conn.

[22] Filed: Nov. 25, 1966

[21] Appl. No.: 596,940

[52] U.S. Cl. .......... 242/55.19 A
[51] Int. Cl. .......... B65h 17/48
[58] Field of Search ....... 242/55.19, 55.19 A, 55.18, 242/55.13; 226/118

[56] References Cited

UNITED STATES PATENTS

| | | | |
|---|---|---|---|
| 2,908,769 | 10/1959 | Fonda | 242/55.19 X |
| 3,065,310 | 11/1962 | Cross | 242/55.19 A X |
| 3,226,048 | 12/1965 | Schwartz | 242/55.19 A |
| 3,241,781 | 3/1966 | Knox | 242/55.19 A |
| 3,252,670 | 5/1966 | Smith | 242/55.19 A |
| 3,281,042 | 10/1966 | Hardison | 226/118 |
| 3,285,526 | 11/1966 | Moore | 242/55.19 A |
| 3,289,964 | 12/1966 | Vito | 242/55.19 A |
| 3,304,019 | 2/1967 | Myers | 242/55.19 A |
| 3,337,150 | 9/1967 | Roys | 242/55.19 A |

*Primary Examiner*—Billy S. Taylor

[57] ABSTRACT

A tape cartridge for containing an endless coil of tape, the cartridge having a rotatable tape reel upon which the tape is wound, and openings in the cartridge along one wall thereof exposed to the tape feeding and tape recording and reproducing mechanism of a recording playback instrument with which the cartridge is to be used, the tape being wound on the reel for feeding in an open loop from the innermost convolution of the coil, past the openings in the cartridge and back to the outermost convolution of the coil.

28 Claims, 6 Drawing Figures

INVENTORS
ALFRED W. WAKEMAN
ROBERT L. MANIERRE
BY
Pennie, Edmonds, Morton, Taylor + Adams
ATTORNEYS

INVENTORS
ALFRED W. WAKEMAN
ROBERT L. MANIERRE

BY
Pennie, Edmonds, Morton, Taylor & Adams
ATTORNEYS

ENDLESS TAPE CARTRIDGE

In tape cartridges of the type outlined above, feeding of the tape in an open loop past the front of the casing is typically effected by a pair of rolls engaging the tape on opposite sides in a drive area located at the front of the cartridge. This feeding is usually the only one used; and rotation of the tape reel, which is required for permitting unwinding at the innermost convolution of the coil and simultaneous winding at the outermost convolution, is normally accomplished solely through frictional engagement with the coiled tape. For this reason, the tape reel in this type of cartridge is mounted for free rotation during normal use of the cartridge with the associated recording-playback instrument; and during such use, the tape normally extends in relatively taut condition from the innermost convolution of the coil, around the various guide members to form the open loop and back to the outermost convolution of the coil. Thus, the orientation of the coil of tape and open loop within the cartridge remains relatively constant and fouling or collection of extraneous tape in a disheveled manner in other portions of the cartridge outside the normal path of movement is avoided.

During the initial starting or stopping of the tape feed and during improper storage or careless handling of the cartridge that occurs at times other than when in the tape recording-playback instrument, an entirely different set of criteria effecting the tape orientation within the cartridge come into being. Since the tape in the loop between the innermost and outermost coil convolution is no longer being driven, accidental rotation of the reel tends to cause tape to unwind from the coil and otherwise become loose in the coil. This, in turn, permits the tape to collect in open unused portions of the cartridge with the result that the tape is subject to becoming fouled, twisted or otherwise damaged.

Even where this loose condition does not itself injure the tape, damage can be caused when the cartridge is subsequently inserted into tape driving position in the recording-playback machine since all this extraneous tape must be taken up before normal unwinding and rewinding may occur; and in some cases, the tape may even become folded upon itself and drawn into the coil in that condition by being grabbed in the nip where the tape meets the outermost coil convolution. This results in complete jamming of the tape. Similarly, the tape may become damaged or fouled during initial placement within the recording-playback machine even if the tape in the open loop is properly oriented. This can occur because the tape when initially engaged by the driving mechanism, will immediately start feeding tape past the drive mechanism at the normal running speed of the system. Since, however, the tape reel is to be driven solely by frictional engagement with the coil, there is a slight delay before the reel attains its normal running speed. During this time, tape being fed toward the outermost coil convolution is not being taken up on the coil but is instead collecting in the open area of the cartridge interior thus presenting, at least momentarily, similar conditions to those found with a carelessly handled cartridge.

Attempts have been made to control tape orientation in the cartridge during non-use; however, these have not been completely successful. One approach has been to include separate reel and/or tape braking devices in the cartridge. These devices can include either a brake shoe that frictionally engages against the reel or tape coiled thereon or alternatively, a latch for locking with appropriately formed surfaces of the reel. The inclusion of such devices, however, necessitates additional assembly steps during the manufacture of the cartridge and thus adds to the overall cost of the product. In addition, such braking devices require associated mechanism for releasing their engagement with the reel and or tape upon insertion of the cartridge into the recording-playback instrument so that the reel is free running and the tape unrestrained in its movement from one side of the coil to the other.

Instead of employing separate braking devices for preventing disorientation of the tape during handling or under other non-operating conditions, cartridges have been constructed with enclosing walls which effectively isolate the tape reel from the remaining interior portion of the cartridge. This enclosing of the reel is usually around the reel periphery with suitable access openings provided for feeding tape from the innermost convolution of coil and to the outermost convolution. In addition, a separate closure plate member is included for placement over the reel to contain the tape against vertical movement. Cartridges constructed in this manner also require additional assembly steps due to the inclusion of the separate closure plate; and due to the fact that the closure plate must overlie the coil of tape, it can only be assembled after the tape is wound upon the reel which can be a disadvantage where the cartridges are to be filled at a location different from where they are manufactured. In addition, cartridges of this type are frequently provided with separate braking devices to further assure that the tape is maintained in proper unfouled orientation during non-use thus further adding to their overall cost.

In accordance with the teachings of the present invention, there is provided a tape cartridge that is foulproof, yet one which requires no additional parts such as separate braking devices. With the cartridge of the present invention, the cartridge casing and reel are constructed in such a manner as to provide a specific storage area for receiving loose tape unwound from the coil during handling of the cartridge when the latter is not in operative association with the recording-playback instrument. Such storage area is provided on an upper extension of the reel hub where loose tape may be wound in a secondary coil and readily unwound in an orderly manner upon subsequent insertion of the cartridge into the recording-playback instrument.

In addition, the interior of the cartridge of the present invention is so constructed to permit free movement of the tape during handling without allowing the tape to become collected in any area where it would be subject to becoming fouled or damaged. During such handling of the cartridge, the tape is permitted to move off the tape reel and into free areas within the cartridge; and tape support members and leveling members formed integrally with the cartridge casing halves maintain the tape at the same level as the tape in the coil and in the same edge seating relationship as the coiled tape. The cartridge of the present invention is also provided with tape guide members so located within the cartridge to further assure that the tape will not become fouled or damaged as any looseness therein is taken up upon initial insertion of the cartridge into tape feeding relationship in the recording-playback instrument.

A fuller understanding of the invention will be obtained from a reading of the following detailed description thereof with reference being made to the accompanying drawings of which:

Figures 1, 2:
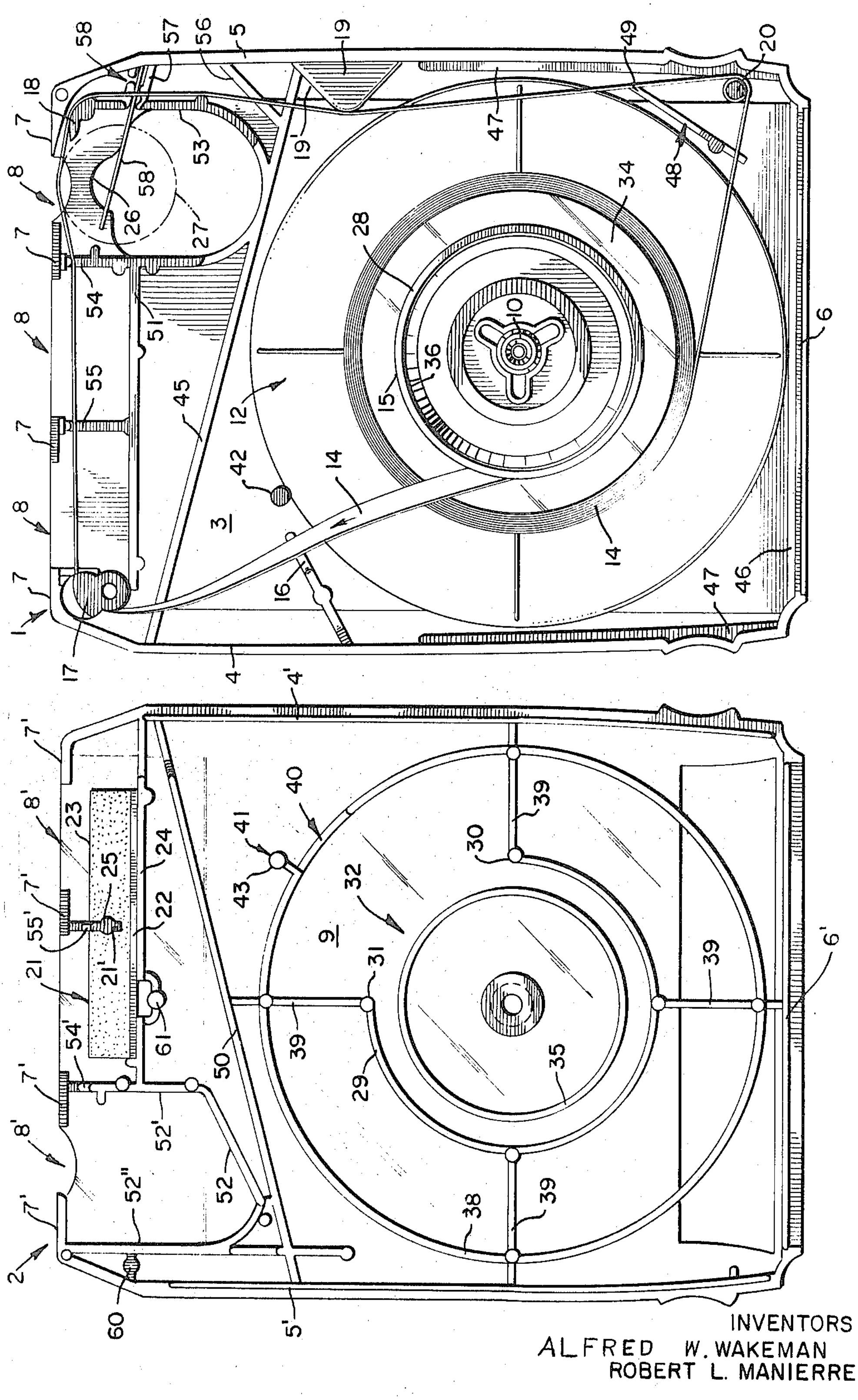
FIG. 1 is a plan view of the bottom of the tape cartridge with a continuous coil of tape shown in normal operative position.
FIG. 2 is a plan view of the inside of the top of the cartridge.

As shown in FIGS. 1 and 2, the cartridge of the present invention is generally comprised of two casing halves 1 and 2 preferably molded from a suitable plastic material. The casing half 1 defines the bottom of the cartridge and is comprised of a bottom wall 3 and edge walls, including side walls 4, 5, back wall 6, and front wall 7. As shown in FIG. 1, the front wall is discontinuous to define a plurality of apertures 8. The other half 2 of the cartridge, which is complementary in shape to the bottom half, comprises edge walls 4′, 5′, 6′ and 7′ adapted to mate with the edge walls of the bottom, and a top cover wall 9. As with the bottom casing half, apertures 8′ are provided in the front wall 7′ of the top for cooperating with the apertures 8 when the two halves are assembled.

The bottom wall of the casing is provided with an upwardly extending post 10 and a raised bearing surface 11 (FIG. 4) for rotatably supporting a tape reel generally designated at 12. This tape reel is comprised of a tape supporting disc 13 for supporting a continuous coil of flexible tape 14 of predetermined width $w$ and a central hub member 15 about which tape is wound. The hub is mounted on the disc in a floating manner such as described in U.S. Pat. No. 3,241,781 granted Mar. 22, 1966.

The direction of movement of the tape from the innermost convolution of the coil to the outermost convolution thereof during use of the cartridge in a recording-playback instrument is controlled by a series of guide members which are laterally offset from the reel and form an open loop of tape in the front of the cartridge. These guide members are all formed integrally with the bottom wall of the casing and comprise a first slanted member 16 over which the tape passes after initially leaving the coil, a post member 17 located in the front corner of the casing defined by the side walls 4, 4′ and the front walls 7, 7′, a guide member 18 located in the opposite front corner of the casing, a side guide member 19, and a rear guide post member 20.

For cooperating with the various mechanism in the tape recording-playback instrument with which the cartridge is to be used, the top casing half is provided with a pressure pad assembly 21, facing outwardly of the apertures 8′, which is adapted to be aligned with the transducer heads of the recording-playback instrument. This pressure pad assembly 21 is formed from an integral pad which is cut centrally as shown at 21′ and is preferably comprised of urethane foam adhesively secured to a styrene backing 22 and provided with a polyester cover 23. For mounting the pressure pad assembly in the top casing half, the cover wall is provided with a downwardly extending rigid member 24 providing a back support and a depending post 25 extending through the cut 21′ of the pad 22.

Driving of the tape in an open loop from the innermost convolution of the coil past the apertures 8, 8′ and to the outermost convolution of the coil is effected through a drive couple frictionally engaging opposite sides of the tape. For permitting this engagement with the tape, the bottom wall of the cartridge may be provided with an opening 26 for receiving the pinch roll of the recording-playback instrument which is adapted to be moved into the cartridge behind the tape extending across the aperture associated with the opening 26 to press the tape against a suitable drive roll also located within the recording-playback instrument. Alternatively, the bottom casing half of the cartridge may be provided with its own pinch roll such as shown in dotted lines at 27 in FIG. 1.

During normal use of the cartridge in a recording-playback instrument, the directions of movement of the tape will be shown by the arrows in FIG. 1 with the reel rotating freely in a clockwise direction through frictional engagement of the tape therewith. Due to the driving forces exerted on the tape, its orientation in the open loop and in the coil is maintained relatively constant and the tape passes neatly without fouling or damage from the innermost coil convolution, past the front of the casing and the apertures and to the outermost coil convolution.

When, however, the cartridge is removed from the recording-playback instrument, the tape is no longer under any positive control and the reel is free to rotate or oscillate when, for example, the cartridge is shaken, dropped, or otherwise roughly treated. This, in turn, tends to cause unwinding of tape from the coil and, in some cases, loosening of the outermost coil convolutions. To prevent fouling or damage of the tape under these conditions, provision is made for temporarily storing tape, as might unwind from the coil, in a storage area disposed above the coil and to also maintain the remaining tape of the loop in unfouled condition whereby it may readily be wound back onto the coil upon insertion of the cartridge into the recording-playback instrument.

Figures 3, 4, 5, 6:
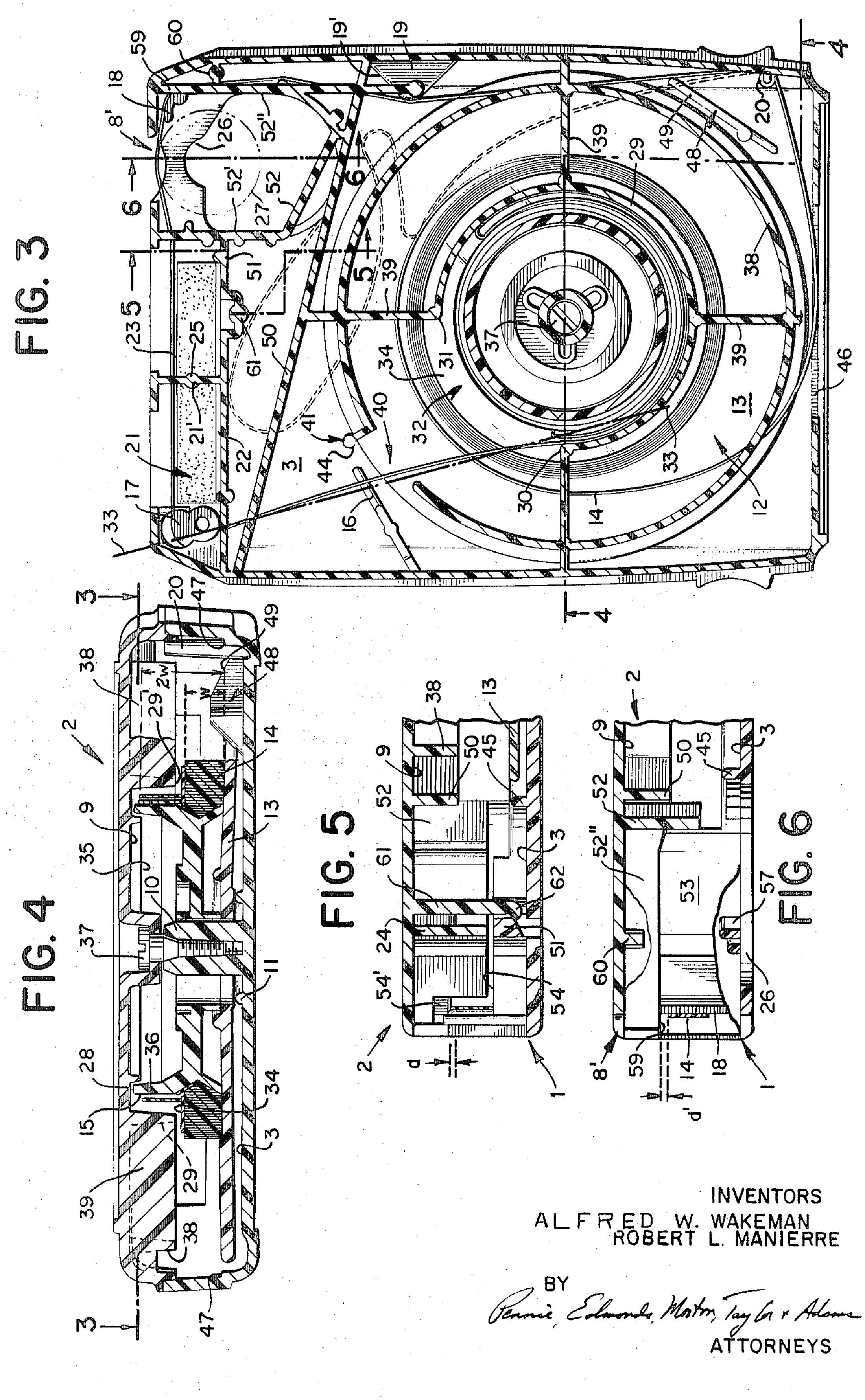
FIG. 3 is a sectional view taken along lines 3—3 of FIG. 4, immediately below the cover wall of the top of the cartridge, showing a representative position of the tape as may occur during handling of the cartridge.
FIG. 4 is a sectional view taken along lines 4—4 of FIG. 3 showing the cartridge storage area and the positioning of portions of tape at different levels in the cartridge.
FIG. 5 is a sectional view taken along lines 5—5 of FIG. 3 showing the vertical orientation of the tape with respect to certain of the cartridge structure.
FIG. 6 is a sectional view taken along lines 6—6 of FIG. 3 showing the vertical orientation of the tape with respect to certain other cartridge structure.

For accomplishing these results, it is seen from FIG. 4 that the upper tape supporting surface of the disc 13 is spaced from the opposed surface of the cover wall by a distance slightly greater than twice the width $w$ of the tape. Also, the hub member 15 which has a V-shaped circumferential outer periphery in the area where it engages the coil of tape supported by the disc further includes an upper extension 28 having an outer cylindrical periphery extending above the coil of tape for receiving therearound tape which becomes unwound from the coil.

For cooperating with the upper extension of the hub so as to define a tape storage area for these unwound coils, the top cover wall of the cartridge is provided with a downwardly extending C-shaped skirt member 29. This skirt member is positioned concentrically with respect to the hub and terminates in a lower edge 29' spaced from the upper surface of the disc 13 by a distance slightly greater than the width of the tape. The C-shaped skirt member terminates in ends 30, 31 so as to provide an opening 32 facing along the normal path of movement of the tape being drawn off the innermost convolution of the coil during use of the cartridge with the recording-playback instrument. More particularly, the end 30 is disposed outside the tangent line 33 (FIG. 3) drawn from the hub to the effective center of the first guide member 16 and the tape engaging surface of the guide member 17. Thus, the skirt member 29 will not interfere with the movement of the tape from the hub to the first guide member.

As shown in FIG. 4, a thin tape separating member 34 is positioned on top of the coiled tape. This separating member which floats in the cartridge and is free to rotate relative to the reel, is annular in shape and extends at least completely across the storage area. It thus assists in preventing tape in the coil therebelow from moving upwardly out of the coil when the cartridge is carelessly handled or associated with a tape recording-playback instrument adapted to receive the cartridge in a vertical or inverted orientation. The separating member also assists in preventing the tape disposed in the storage area from falling into the convolutions of the coil therebelow if for any reason these lower coils become loosely oriented about the hub. The separating member is placed in position during assembly of the tape into the cartridge. To do this, the end of the tape leaving the innermost coil convolution is fed through the seating member before being spliced to the other tape end to form the continuous coil.

A representative position of the tape as may occur during handling of the cartridge is shown in FIG. 3. There it is seen that progressive rotation of the reel in a counterclockwise direction has caused tape from the outermost coils to unwind. Due, however, to the storage area provided by the upper extension of the hub and the encircling skirt member, this tape is restrained in its movement and caused to wind neatly in the storage area. Accordingly, when the cartridge is subsequently inserted into the recording-playback instrument in tape feeding position, this collected tape will readily move out of the storage area and to the guide members 16, 17 without fouling.

Under certain conditions during handling of the cartridge in such a manner causing the reel to rotate in a clockwise direction as viewed in FIG. 3, tape will become unwound from the innermost convolutions of the coil. When this happens, the unwound tape will wind about the upper extension of the hub in the direction opposite to that shown in FIG. 3 and at the same time causes a tightening of the outermost coil convolutions. Upon subsequent insertion of the cartridge in this condition into the recording-playback instrument, feeding of the tape, as caused by the drive couple, will unwind this stored tape; and due to the orderly manner in which it has been wound about the hub's upper extension, this unwound tape will move to the guide members 16, 17 without fouling. Since, however, the tape has been wound in the storage area in a direction opposite to that shown in FIG. 3, the pulling of the tape from this area will, by frictional engagement with the hub extension, tend to rotate the reel in a direction causing the tightened tape at the outermost coil convolution to unwind. This continues until all the excess tape in the storage area is completely removed; and then, the rotation of the hub is reversed and the excess tape unwound from the outermost coil convolutions taken up until the normal running condition as shown in FIG. 1 is attained.

To maintain the tape which may become unwound from the coil and not fed into the storage area during handling of the cartridge in an orderly state, the cartridge halves are provided with strategically located tape restraining members formed integrally therewith.

With reference to FIGS. 2, 3 and 4, it is seen that the top cover wall of the casing is provided with a depending annular guard member 35 adapted to be received within the hub member which is recessed in its upper surface as shown at 36 (FIG. 4) for this purpose. This guard member prevents tape from moving over the top of the hub and thus prevents it from wrapping about the post 10 supporting the hub or about the countersunk portion of the cover through which the screw 37 is inserted to hold the cartridge halves together. Movement of the tape in this manner could occur if for any reason the tape in the storage area were to bend along its axis and tip out of the vertical orientation with its upper edge pointed toward the space between the hub and overlying portion of the top cover wall. Such tipping to the extent that would cause the tape to orient itself in this way and permit movement in a horizontal plane over the top of the hub is, however, normally prevented due to the spacing of the hub extension from the skirt member. As seen from FIG. 3, this spacing is less than the width w of the tape.

Also, formed integrally with the top cover wall of the cartridge for restraining the tape against movement into an orientation where it would be subject to becoming fouled or damaged in a leveling ring 38 which extends downwardly from the cover wall of the casing near the periphery of the reel disc. This leveling ring 38 is connected to the skirt member 29 by a plurality of radially extending ribs 39; and is provided with an opening 40 so as to permit free movement of the tape from the reel to the guide means 16 in the zone to the right of the tangent line 33 as shown in FIG. 3. The radial ribs, leveling ring and skirt member all terminate at the same spaced distance above the reel disc (See FIG. 4) and thus hold the tape disposed thereunder in the same vertical elevation as that of the coil.

For properly directing tape into the storage area in a coiled condition opposite to that shown in FIG. 3, a supplementary guide post 41 is provided. This post 41 is positioned at a location laterally offset from the guide member 16 and is comprised of two post halves 42, 43, one of which is formed integrally with the bottom of the casing and the other of which is formed integrally with the top of the casing in axial alignment therewith. This supplementary guide post has a vertical tape engaging surface 44 facing the guide member 16. When the cartridge is handled so as to cause tape to wind up in the storage area in a clockwise direction, the angular position of the tape on the slanted guide member 16 may tend to cause this portion of the tape to slip under the section of the leveling ring 38 disposed opposite such guide. The vertical guide post 41 eliminates this tendency and stands the tape up vertically for proper winding about the hub's upper extension.

As shown in FIGS. 1, 4 and 5, the bottom half of the casing is also provided with several raised tape seating means in the form of thin elongated ribs 45, 46 and 47 formed integrally with the bottom wall of the casing and disposed along the front, back and sides of the cartridge. These seating means have upper tape seating surfaces located at about the same height as the upper surface of the disc supporting the coiled tape for maintaining tape at this level in the casing when it is moved off the disc. In addition, a ramp member 48 is formed integrally with the bottom of the casing adjacent the rear guide member 20. This ramp member, which is disposed diagonally in the corner of the casing bottom and radially outwardly of the leveling ring 38 of the top of the casing, has an upper extreme surface which, as shown in FIG. 4, is spaced vertically from the lower surface of the leveling ring 38 by a distance which is less than the width $w$ of the tape. The ramp member substantially eliminates the chances of any loose tape which may become disposed along the side of the cartridge outside of the coil supporting disc from being wound onto the coil in a folded or S loop condition as the cartridge is initially inserted into tape driving association in the tape recording-playback instrument.

S loops can be formed upon starting of the tape feed when several coils of tape lie loose outside of the disc. The outermost coil tends to pull the intermediate coils radially in toward the center of the disc; and because the intermediate coils have excess length due to their loose condition, there is a tendency that this looseness will be taken up by the tape of the intermediate coils doubling back upon themselves in an S loop which becomes folded into the coil. With the ramp member 48, these loose coils are easily shaken out over the upper surface of the ramp and when in this overlying position on the ramp, they are prevented from moving radially inwardly toward the coil disposed on the disc where they could become folded into the coil since the vertical spacing of the ramp from the leveling ring 38 is less than the width of the tape. Also, the back guide member 20 cooperates with the ramp during this time when loose tape is being straightened out by holding the outermost section of loose tape from interference with the ramp.

In the front of the cartridge is a leveling member 50 comprised of a thin elongated rib and constructed integrally with the top cover wall of the casing. This rib extends downwardly from the cover wall in axial alignment with the raised seating rib 45 and is spaced therefrom by a distance slightly greater than the width of the tape. Thus, a free area is provided in the front of the cartridge and tape passing into this area will be maintained at the proper coiling level and in a generally vertical plane.

With reference to FIGS. 5 and 6, it will be noted that the area immediately behind the apertures 8, 8' is sealed off intermediate the guide members 17, 18 from the remainder of the cartridge interior. In particular, the rigid pad support member 24 of the cartridge cover is disposed in vertical alignment with a raised rib member 51 formed in the bottom of the casing. Also, the cover wall is provided with depending members 52, 52', 52'' disposed around the opening 26 when the cartridge halves are assembled; and the guide member 18 in the cartridge bottom is provided with an extension shield 53 cooperating with the member 52'' for closing access to the opening 26 between the members 18 and 52. Also, as shown in FIGS. 1 and 3, the guide 18 is provided with an extending blade portion 18' which faces toward the roller 27 and has a forward edge in close association therewith. This blade prevents tape which, for any reason, may tend to stick to the roller from being carried inside the guide 18.

The members 24, 51, 52, 52', 52'' and 53 together comprise a barrier isolating the areas located immediately behind the apertures 8, 8' from the remaining interior portion of the cartridge. This barrier prevents tape which may be moved into the free area in front of the reel during handling or when initially placed in tape feeding relationship in the recording-playback instrument from becoming fouled with the structure located immediately behind the apertures 8, 8', and in particular, prevents tape from becoming wrapped around the pinch roller located in the tape feeding region, defined by the opening 26, of the cartridge. This free area thus provides a convenient front storage area where loose tape may be readily directed and held in proper, unfouled condition. For assisting in directing loose tape into this front storage area, the side guide member 19 is provided with a front surface 19' which faces toward this area. Thus, tape coming around the roller 27 and into engagement with the surface 19' will be deflected toward the front storage area rather than down the side of the cartridge where space is limited. The tape shown by the dotted lines in FIG. 3 represents loose tape in the front storage area of the cartridge.

To further assist in taking up loose tape, such as shown in dotted lines in FIG. 3, without causing fouling, and in particular, without causing folding of the tape into S loops and winding of the folded portions onto the coil, the post 20 is located in the back of the cartridge. As shown in FIGS. 1 and 3, this post and the guide member 18 are disposed in a common plane which is perpendicular to the bottom wall of the cartridge and located at a position laterally offset from the hub. Preferably, this plane extends approximately tangentially to the reel disc 13.

This positioning of the post causes the tape leaving the guide member 18 to move in an initial direction away from the coil before being pulled onto the outermost coil convolution. Thus, any excess tape located in a serpentine fashion in the front of the cartridge will be straightened out before meeting with the coil as might not happen if the tape were led directly from the guide member 18 to the outermost coil convolution.

The side guide member 19, although positioned inwardly of the plane extending between the guides 18 and 20, does not interfere with straightening of the tape for it will not engage against the tape in any positive way until all loose tape has been taken up and assumed the running orientation shown in FIG. 1. At this point, the guide 19 will direct the tape onto the disc 13 which will, in turn, provide an intermediate support for the tape and further assist in maintaining it at the proper coiling level as it is directed to the guide 20.

As a further assistance in preventing tape fouling, the cartridge of the present invention is constructed to guide the tape past the front of the cartridge and back toward the outer coil convolution in a smooth manner which is unaffected by any slight misalignment of the two rollers of the tape driving mechanism which would otherwise tend to cause the tape to become creased or thrown out of the front of the cartridge. Misalignment of the tape feeding rollers from a perfectly parallel relationship will normally tend to cause the tape to move either upwardly or downwardly along the axes of the roller; and this, in turn, causes misalignment of the tape with the transducer heads of the tape recording-playback instrument.

In the past, cartridges have been constructed with guide members positioned both above and below the tape to provide a vertical space just slightly greater than the width of the tape through which the tape must pass. These guides function to hold the tape in proper vertical alignment for proper cooperation with the transducer heads irrespective of any slight misalignment of the feeding rollers. Such guides have been disposed on both sides of the tape feeding region of the cartridge so that vertical movement of the tape is restrained both immediately before the tape is fed between the drive mechanism and immediately thereafter.

Although these guide members are effective in limiting the vertical movement of the tape as might otherwise be caused by misalignment of the feed rollers, their inclusion produces a condition in which the tape is being acted upon by two opposing forces, one tending to direct the tape upwardly or downwardly, as the case may be, and the other restraining the tape against such movement. This, in turn, causes the tape as it is passed between the feed rollers of the drive mechanism to distort with the result that either the tape is creased if this distorted portion is fed through the rollers or it is caused to fly out of the cartridge through the aperture 8′ provided for the tape drive mechanism.

To avoid this undesirable condition, the cartridge of the present invention is constructed with a vertical tape guiding system which restrains vertical movement of the tape in such a manner whereby slight misalignment of the feed rollers may be accommodated without causing fouling or damage to the tape. More particularly, the cartridge is provided with vertical tape guides on opposite sides of the tape feeding region which restrain vertical movement of the tape immediately before it is fed between the feed rollers so as to keep the tape properly aligned with the transducer heads of the recording-playback instrument but which permit a greater vertical movement of the tape immediately after it has passed through such rollers so as to prevent damage to the tape by the misaligned feed rollers.

With reference to the drawings, FIGS. 1, 2, 5 and 6 show the construction of the vertical tape guiding system of the present invention for effecting this smooth feeding of the tape past the feed rollers of the recording-playback instrument. In FIG. 1, the vertical tape guides of the bottom half of the cartridge are shown at 54 and 55; and in FIG. 2, the cooperating guides of the top half of the cartridge are shown at 54′ and 55′. Referring to FIG. 5, where one set of these guides 54, 54′ is shown, it is seen that their tape engaging surfaces are spaced vertically from each other by a distance which is only slightly greater than the width of the tape, the difference in dimensions of the tape and the spacing between the guides being indicated at *d*. The guides 55, 55′ are constructed in the same manner as guides 54, 54′ so that together they keep the tape properly aligned in a vertical orientation relative to the transducer mechanism entering the cartridge through the apertures 8′ disposed in front of the pressure pad assembly 21.

On the downstream side of the tape feeding region of the cartridge, vertical tape guides 56, 57 are provided in the bottom half of the cartridge, guide 57 being part of the structure 58 for retaining a spring wire 58′ in the cartridge construction not having its own pinch roller 27. The tape engaging surfaces of the guides 56 and 57, as defined by their upper edges, are disposed at equal heights from the bottom wall of the cartridge; and from FIG. 6, where guide 57 is shown, it is seen that this height is lower than that of the guides 54, 55 on the opposite or upstream side of the tape feeding region of the cartridge. Also, it is to be noted from reference to FIGS. 1 and 6 that immediately adjacent the tape feeding region of the cartridge on the downstream side thereof, the bottom wall of the cartridge is spaced a considerable distance from the lower edge of the tape. Thus, the tape is also free to move downwardly to a greater extent on the downstream side of the tape feeding region than on the upstream side.

For restraining upward movement of the tape once it has passed through the tape feeding region, the top half of the cartridge is provided with the vertical guide members 59 and 60, member 59 being the extended portion of the member 52′′ disposed beyond the shield 53. As shown in FIG. 6 where the tape 14 is in the same vertical orientation as in FIG. 5, the tape engaging surface of the guide 59 is spaced from the upper edge of the tape by a distance *d*′ which is greater than the distance d shown in FIG. 5.

In order to securely hold the guides 54, 54′ and 55, 55′ in proper alignment with each other, the upper and lower cartridges halves are provided with cooperating locking members 61, 62, shown most clearly in FIG. 5, which engage with each other as the cartridge halves are placed together. This locking device is also advantageously used during initial assembly of the cartridge to hold the cartridge halves together during any necessary testing and feeding of the tape into a taut condition and while the screw 37 is threaded through the center post of the cartridge.

With the construction described above, any slight misalignment of the feed rollers which may, for example, cause the tape to ride up the rollers will immediately cause the tape on the upstream side of the rollers to engage against the overlying guides 54′, 55′. When the tape is in this raised position, the overlying vertical guide 59′ on the downstream side of the feed rollers will, however, be spaced vertically from the upper edge of the tape and thus permit the tape to move vertically under the influence of the misaligned feed rollers. Accordingly, the tape will pass smoothly through the feed rollers without causing such distortion which would foul or otherwise damage the tape. Likewise, downward movement of the tape as caused by misaligned feed rollers will be accommodated due to the relative heights of the underlying guiding surfaces.

The above description of the present invention is of the presently preferred construction; and it is to be understood that various changes thereto may be made without departing from the scope of the invention as set forth in the following claims.

We claim:

1. A magazine for an endless flexible tape comprising:

a. a bottom wall, a top cover wall and edge walls connected together to define a casing having a front portion adapted to be placed in association with a recording-playback instrument, said casing having at least one aperture in said front portion for exposing the interior thereof to said recording-playback instrument;

b. a tape reel rotatably mounted on the bottom wall of said casing for holding a continuous coil of tape, said tape reel including:

1. a tape supporting disc having an upper surface spaced below said top cover wall by a distance at least slightly greater than twice the width of said tape for supporting one edge of said coil of tape, and
2. a hub about which said coil of tape is adapted to be wound in engagement therewith, said hub having an upper extension adapted to extend above said coil of tape for receiving completely therearound tape unwound from said coil;

c. a plurality of tape guide means laterally offset from said tape reel for directing the tape in an open loop from the innermost convolution of said coil, past said aperture and to the outermost convolution of said coil; and d. a skirt member extending downwardly from said top cover wall at a position adjacent to but spaced radially outwardly of the upper extension of said hub to define a storage area for containing tape wound about said upper extension and supported by said coil.

2. A magazine for an endless flexible tape according to claim 1 wherein:

a. said skirt member terminates in a lower edge spaced from the underlying tape supporting disc by a distance slightly greater than the width of said tape.

3. A magazine for an endless flexible tape comprising:

a. a bottom wall, a top cover wall and edge walls connected together to define a casing having a front portion adapted to be placed in association with a recording-playback instrument, said casing having at least one aperture in said front portion for exposing the interior thereof to said recording-playback instrument;

b. a tape reel rotatably mounted on the bottom wall of said casing for holding a continuous coil of tape, said tape reel including:

1. a tape supporting disc having an upper surface spaced below said top cover wall by a distance at least slightly greater than twice the width of said tape for supporting one edge of said coil of tape, and
2. a hub about which said coil of tape is adapted to be wound, said hub having an upper extension adapted to extend above said coil of tape for receiving therearound tape unwound from said coil;

c. a plurality of tape guide means laterally offset from said tape reel for directing the tape in an open loop from the innermost convolution of said coil, past said aperture and to the outermost convolution of said coil; and d. a skirt member extending downwardly from said top cover wall at a position adjacent to but spaced radially outwardly of the upper extension of said hub to define a storage area for containing tape wound about said upper extension, said skirt member being C-shaped with the opening defined by the ends thereof facing the first of said tape guide means to which the tape is directed after leaving the innermost convolution of said coil.

4. A magazine for an endless flexible tape according to claim 3 wherein:

a. said skirt member is spaced radially from the upper extension of said hub by a distance less than the width of said tape.

5. A magazine for an endless flexible tape according to claim 3 wherein:

a. the portion of said hub about which said coil of tape is adapted to be wound has a V-shaped circumferential outer periphery for engagement with the innermost convolution of said tape; and b. the upper extension of said hub has an outer cylindrical periphery.

6. A magazine for an endless flexible tape according to claim 5 wherein:

a. said hub is mounted in said cartridge for relative rotation with respect to said disc.

7. A magazine for an endless flexible tape according to claim 5 further comprising:

a. a thin separating member adapted to be positioned on said coil of tape and spanning the storage area between the upper extension of said hub and said skirt member for separating the tape in the coil from that wound about the upper extension of said hub.

8. A magazine for an endless flexible tape according to claim 7 wherein:

a. said separating member is positioned in floating relationship within said casing for rotation relative to said reel.

9. A magazine for an endless flexible tape according tp claim 8 further comprising:

a. a recessed area in the upper surface of said hub having an outer circular periphery; and b. a guard member fixed to said cover wall and extending downwardly into said recessed area, said guard member having an outer circular surface disposed at a position closely adjacent the inner wall surface of said hub as defined by the outer periphery of said recessed area.

10. A magazine for an endless flexible tape according to claim 9 further including:

a. tape leveling means fixed to said cover wall over said tape supporting disc and extending downwardly therefrom to a point spaced from said disc by a distance slightly greater than the width of said tape.

11. A magazine for an endless flexible tape according to claim 10 wherein said tape leveling means includes:

a. a circular ring in generally vertical alignment with the periphery of said disc and having an opening therein for receiving tape extending from said innermost convolution of said coil to the first of said tape guide means; and b. radially extending ribs connecting said circular ring to said skirt member.

12. A magazine for an endless flexible tape comprising:

a. a casing having a bottom wall, a top cover wall, a front wall with at least one aperture therein, a back wall, and side walls connecting said front and back walls together, and a tape feeding region defined by a part of said aperture;

b. a tape reel rotatably mounted on the bottom wall of said casing for holding a continuous coil of tape, said tape reel including:
   1. a tape supporting disc having an upper surface spaced below said top cover wall by a distance at least slightly greater than twice the width of said tape for supporting one edge of said coil of tape, and
   2. a hub about which said coil of tape is adapted to be wound, said hub having an upper extension adapted to extend above said coil of tape for receiving therearound tape unwound from said coil;
c. first tape guide means laterally offset from said tape reel for directing the tape in an open loop from the innermost convolution of said coil, past said aperture and tape feeding region in a generally vertical plane and to the outermost convolution of said coil;
d. second tape guide means disposed adjacent said one edge for restraining vertical movement of said tape between predetermined limits as it passes across said aperture on the upstream side of said tape feeding region and for permitting further vertical movement of said tape on the immediate downstream side of said region; and
e. a skirt member extending downwardly from said top cover wall at a position concentric with and spaced radially outwardly of the upper extension of said hub to define a storage area for containing tape wound about said upper extension, said skirt member being C-shaped with the opening defined by the ends thereof facing the first of said first tape guide means to which the tape is directed after leaving the innermost convolution of said coil.

13. A magazine for an endless flexible tape according to claim 12 wherein:

a. said first tape guide means comprises:
   1. a pair of first guide members, one of which is positioned in the corner of the casing defined by said front wall and one of said side walls for guiding the tape from the innermost convolution of said coil toward the aperture in said front wall and the other of which is positioned in the corner of said casing defined by said front wall and the other of said side walls for guiding the tape after traveling past said aperture, and
   2. a second guide member positioned in the corner of said casing defined by said back wall and said other side wall for guiding the tape after it leaves the other of said first guide members.

14. A magazine for an endless flexible tape according to claim 3 further including:

a. tape leveling means fixed to said cover wall over said tape supporting disc and extending downwardly therefrom to a point spaced from said disc by a distance slightly greater than the width of said tape, said leveling means including a circular ring in generally vertical alignment with the periphery of said disc and having an opening therein for receiving tape extending from said innermost convolution of said coil to the first of said tape guide means; and
b. a ramp member fixed to said bottom wall adjacent said second guide member and radially outwardly of said circular ring with the upper surface thereof spaced vertically from the lower surface of said circular ring by a distance less than the width of said tape.

15. A magazine for an endless flexible tape according to claim 13 further including:

a. barrier means positioned within said casing at a location spaced laterally from said front wall and from said tape reel and isolating each of said apertures intermediate said pair of first guide members from said tape reel.

16. A magazine for an endless flexible tape according to claim 15 further including:

a. raised tape seating means extending upwardly from the bottom wall of said casing between said tape reel and said barrier means and side and back walls and having upper tape seating surfaces disposed at about the same level as the upper surface of said tape supporting disc.

17. A magazine for an endless flexible tape comprising:

a. a casing having a bottom wall, a top cover wall, a front wall, a back wall, and side walls connecting said front and back walls together;
b. a first aperture in said front wall for receiving the transducer mechanism of a recording-playback instrument;
c. a second aperture in said front wall defining the tape driving region of the cartridge for accommodating a tape feeding mechanism;
d. a tape reel rotatably mounted on the bottom wall of said casing for holding a continuous coil of tape, said tape reel including:
   1. a tape supporting disc for supporting one edge of said coil of tape, and
   2. a hub about which said coil of tape is adapted to be wound;
e. first tape guide means laterally offset from said tape reel for directing the tape in an open loop from the innermost convolution of said coil, past said first aperture and then past said second aperture in a generally vertical plane and then to the outermost convolution of said coil; and
f. second tape guide means disposed in the front of said casing adjacent said apertures for restraining vertical movement of the tape passing across said apertures, said second guide means including tape engaging surfaces located in vertical alignment above and below the tape with the spacing of the engaging surfaces on the upstream side of said tape feeding region being less than the spacing on the immediate downstream side of said region.

18. A magazine for an endless flexible tape according to claim 17 further including:

a. locking means disposed in the front of said cartridge at a location adjacent to said front wall for locking said top cover wall and bottom wall together to hold said tape engaging surfaces in said vertical spaced alignment with each other, said locking means comprising first and second cooperating hook members formed integrally with said top cover wall and bottom wall, respectively, of said casing.

19. A magazine for an endless flexible tape comprising:

a. a casing having a bottom wall, a top cover wall, a front wall with at least one aperture therein, a back wall, and side walls connecting said front and back walls together;

b. a tape reel rotatably mounted on the bottom wall of said casing for holding a continuous coil of tape;

c. tape guide means laterally offset from said tape reel for directing the tape in an open loop from the innermost convolution of said coil, past said aperture and to the outermost convolution of said coil and including:

1. a pair of first guide members disposed adjacent said front wall on opposite sides of said aperture for directing the tape past said aperture, and
2. a second guide member positioned in the rear of said casing for guiding the tape after it leaves said pair of guide members, said second guide member and the last of the first guide members directing said tape past said aperture being disposed in a plane which is laterally offset from said hub;

d. barrier means positioned within said casing at a location immediately adjacent to but spaced from said front wall forwardly of said tape reel and isolating each aperture intermediate said pair of guide members from said tape reel; and e. a free unobstructed area within said casing extending from said tape reel to said barrier means for receiving loose tape unwound from said coil and fed past the pair of first guide members.

20. A magazine for an endless flexible tape according to claim 19 wherein:

a. one of said pair of guide members is positioned in the corner of said casing defined by said front wall and one of said side walls for guiding the tape from the innermost convolution of said coil toward the aperture in said front wall;

b. the other of said pair of guide members is positioned in the corner of said casing defined by said front wall and the other of said side walls for guiding the tape after traveling past said aperture;

c. the portion of said casing adjacent said front wall and the other of said side walls includes a tape feeding region for receiving a pair of tape feeding rollers engaging the opposite sides of the tape with one of the rollers being positioned in said casing inwardly of said front wall; and d. the other of said pair of guide members includes a blade portion facing toward and in closely spaced association with said one roller on the downstream side thereof for guiding tape away from said one roller.

21. A magazine for an endless flexible tape according to claim 19 further including:

a. a third guide member disposed adjacent said other side wall at a location inwardly thereof for directing tape from the other of said first guide members toward said tape supporting disc.

22. A magazine for an endless flexible tape according to claim 21 wherein:

a. said plane extends generally tangentially to said tape supporting disc.

23. A magazine for an endless flexible tape according to claim 19 wherein said tape reel includes:

a. a tape supporting disc for supporting one edge of said coil of tape; and b. a hub about which said coil of tape is adapted to be wound.

24. A magazine for an endless flexible tape according to claim 23 further including:

a. raised front tape seating means extending upwardly from the bottom wall of said casing between said barrier means and said tape reel, and having an upper tape seating surface disposed at about the same level as the upper surface of said tape supporting disc; and b. tape leveling means extending downwardly from the top cover wall of said casing and spaced therefrom by a distance slightly greater than the width of said tape.

25. A magazine for an endless flexible tape according to claim 23 further including:

a. tape leveling means fixed to said cover wall over said tape supporting disc and extending downwardly therefrom to a point spaced from said disc by a distance slightly greater than the width of said tape, said leveling means including a circular member in generally vertical alignment with a portion of the periphery of said disc and having an opening therein for receiving tape extending from said innermost convolution of said coil to the tape guide means at the front of the cartridge; and b. a ramp member fixed to said bottom wall adjacent said second guide member and radially outwardly of said circular member with the upper surface thereof spaced vertically from the lower surface of said circular member by a distance less than the width of said tape.

26. A magazine for an endless flexible tape comprising:

a. a bottom wall, a top cover wall and edge walls connected together to define a casing having a front portion adapted to be placed in association with a recording-playback instrument, said casing having at least one aperture in said front portion for exposing the interior thereof to said recording-playback instrument;

b. a tape reel rotatably mounted on the bottom wall of said casing for holding a continuous coil of tape, said tape reel including:

1. a tape supporting disc having an upper surface spaced below said top cover wall by a distance at least slightly greater than twice the width of said tape for supporting one edge of said coil of tape, and
2. a hub about which said coil of tape is adapted to be wound, said hub having an upper extension adapted to extend above said coil of tape for receiving therearound tape unwound from said coil;

c. a plurality of tape guide means laterally offset from said tape reel for directing the tape in an open loop from the innermost convolution of said coil, past said aperture and to the outermost convolution of said coil; and d. a skirt member extending downwardly from said top cover wall at a position adjacent to but spaced radially outwardly of the upper extension of said hub to define a storage area for containing tape wound about said upper extension, said skirt member being spaced radially relative to the upper extension of said hub by a distance sufficiently small to maintain tape wound about said upper extension in a generally vertical orientation, and said skirt member being C-shaped with the opening defined by the ends thereof facing the first of said tape guide means to which the tape is directed after leaving the innermost convolution of said coil.

27. A magazine for an endless flexible tape comprising:

a. a bottom wall, a top cover wall and edge walls adapted to be connected together to define a casing having a front portion adapted to be placed in association with a recording-playback instrument, said casing having at least one aperture in said front portion for exposing the interior thereof to said recording-playback instrument;

b. a tape reel rotatably mounted on the bottom wall of said casing for holding a continuous coil of tape, said tape reel including:

1. a tape supporting disc having an upper surface spaced below said top cover wall by a distance at least substantially equal to twice the width of said tape for supporting one edge of said coil of tape, and
2. a hub about which said coil of tape is adapted to be wound in engagement therewith, said hub having an upper extension adapted to extend above said coil of tape for receiving completely therearound tape unwound from said coil;

c. a plurality of tape guide means laterally offset from said tape reel for directing the tape in an open loop from the innermost convolution of said coil, past said aperture and to the outermost convolution of said coil; and d. means positioned adjacent to but spaced radially outwardly of the upper extension of said hub and extending axially substantially from the top wall to said coil of tape to define a storage area for containing tape wound about said upper extension in adjacently confined relation therewith and supported above said coil.

28. A magazine for an endless flexible tape comprising:

a. a bottom wall, a top cover wall and edge walls connected together to define a casing having a front portion adapted to be placed in association with a recording-playback instrument, said casing having at least one aperture in said front portion for exposing the interior thereof to said recording-playback instrument;

b. a tape reel rotatably mounted on the bottom wall of said casing for holding a continuous coil of tape, said tape reel including:

1. a tape supporting disc having an upper surface spaced below said top cover wall by a distance at least slightly greater than twice the width of said tape for supporting one edge of said coil of tape, and
2. a hub about which said coil of tape is adapted to be wound in engagement therewith, said hub having an upper extension adapted to extend above said coil of tape for receiving completely therearound tape unwound from said coil;

c. a plurality of tape guide means laterally offset from said tape reel for directing the tape in an open loop from the innermost convolution of said coil, past said aperture and to the outermost convolution of said coil; and d. means extending downwardly from said top cover wall at a position adjacent to but spaced radially outwardly of the upper extension of said hub to define a storage area for containing tape wound about said upper extension and supported by said coil.

* * * * *